United States Patent
McEldowney (10) Patent No.: US 8,704,763 B2
(45) Date of Patent: *Apr. 22, 2014

(54) IMAGE CONTRAST ENHANCEMENT IN DEPTH SENSOR

(75) Inventor: Scott McEldowney, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 400 days.

This patent is subject to a terminal disclaimer.

(21) Appl. No.: 13/267,458

(22) Filed: Oct. 6, 2011

(65) Prior Publication Data

US 2012/0026085 A1   Feb. 2, 2012

Related U.S. Application Data

(63) Continuation of application No. 12/827,149, filed on Jun. 30, 2010, now Pat. No. 8,054,290, which is a continuation of application No. 12/472,921, filed on May 27, 2009, now abandoned.

(51) Int. Cl.
*G09G 5/00* (2006.01)
(52) U.S. Cl.
USPC .......................................... 345/156; 463/36
(58) Field of Classification Search
USPC ........... 345/156, 163–166, 157, 204, 690, 87; 348/207.99, E13.045; 250/206, 208.1; 463/36
See application file for complete search history.

(56) References Cited

U.S. PATENT DOCUMENTS

| | | | |
|---|---|---|---|
| 5,557,324 A | 9/1996 | Wolff | |
| 6,346,933 B1 | 2/2002 | Lin | |
| 6,503,195 B1 * | 1/2003 | Keller et al. | 600/160 |
| 6,810,135 B1 | 10/2004 | Berenz et al. | |
| 7,425,073 B2 | 9/2008 | Wood et al. | |
| 7,489,391 B2 | 2/2009 | Engheta et al. | |
| 2002/0135581 A1 * | 9/2002 | Russell et al. | 345/474 |
| 2003/0035579 A1 * | 2/2003 | Yang et al. | 382/169 |
| 2005/0190157 A1 | 9/2005 | Oliver et al. | |

(Continued)

FOREIGN PATENT DOCUMENTS

WO    2008011050 A2    1/2008

OTHER PUBLICATIONS

Lin, et al."Separation and Contrast Enhancement of Overlapping Cast Shadow Components using Polarization", Retrieved at<<http://repository.upenn.edu/cgi/viewcontent.cgi?article=1291&context=ese_papers>>, 2006, pp. 11.

(Continued)

*Primary Examiner* — Stephen Sherman
(74) *Attorney, Agent, or Firm* — Judy Yee; Micky Minhas (57) ABSTRACT

Embodiments related to the enhancement of contrast in an image pattern in a structured light depth sensor are disclosed. For example, one disclosed embodiment provides, in a structured light depth sensor system comprising a structured light depth sensor, a method comprising projecting a light pattern onto an object, detecting via an image sensor an image of the light pattern as reflected from the object, increasing a contrast of the light pattern relative to ambient light present in the image of the light pattern as reflected from the object to form a contrast-enhanced image of the light pattern as reflected from the object, and based upon a motion of the object as detected via the contrast-enhanced image of the light pattern, controlling an application that is providing output to a display.

18 Claims, 4 Drawing Sheets

(56) References Cited

U.S. PATENT DOCUMENTS

| | | |
|---|---|---|
| 2006/0221250 A1 | 10/2006 | Rossbach et al. |
| 2007/0147697 A1 | 6/2007 | Lee et al. |
| 2007/0183647 A1* | 8/2007 | Allman et al. ............... 382/154 |
| 2008/0252882 A1 | 10/2008 | Kesterson |
| 2008/0259034 A1* | 10/2008 | Lee et al. ..................... 345/166 |
| 2009/0016572 A1 | 1/2009 | Hassebrook et al. |
| 2009/0039235 A1 | 2/2009 | MacFarlane et al. |
| 2009/0116742 A1* | 5/2009 | Nishihara .................... 382/173 |

OTHER PUBLICATIONS

Schuon, et al. "High-Quality Scanning Using Time-Of-Flight Depth Superresolution", Retrieved at<<http://ieeexplore.ieee.org/stamp/stamp.jsp?arnumber=04563171 >>, 2008 IEEE, pp. 7.

* cited by examiner

IMAGE CONTRAST ENHANCEMENT IN DEPTH SENSOR

CROSS-REFERENCE TO RELATED APPLICATIONS

This application is a continuation of U.S. patent application Ser. No. 12/827,149, titled IMAGE CONTRAST ENHANCEMENT IN A DEPTH SENSOR and filed Jun. 30, 2010, which is a continuation of U.S. patent application Ser. No. 12/472,921, titled IMAGE CONTRAST ENHANCEMENT IN DEPTH SENSOR and filed May 27, 2009, the disclosures of which are hereby incorporated by reference in their entireties.

BACKGROUND

Image-based depth-sensors may be used in a variety of different environments. For example, an image-based depth sensor may be used with a video game system to allow players to interact with the video game system through the use of bodily gestures alone, without the use of hand-held motion sensors or the like to detect the gestures.

Some image-based depth sensors utilize structured light to sense depth in an image. In such systems, a projector is used to illuminate a target (object) with a predefined light pattern. An image of this light pattern as reflected by the target is then acquired via an image sensor, and depth information is calculated from the distortion of the pattern relative to a known reference pattern in the image caused by the shape of objects in the target. The performance of such image-based depth sensors may be dependent upon the contrast of the light pattern in the image, which may be dependent upon the intensity and nature of ambient light.

SUMMARY

Accordingly, various embodiments are described herein that are related to the enhancement of contrast in an image pattern in a structured light depth sensor. For example, one disclosed embodiment provides, in a structured light depth sensor system comprising a structured light depth sensor, a method comprising projecting a light pattern onto an object, detecting via an image sensor an image of the light pattern as reflected from the object, increasing a contrast of the light pattern relative to ambient light present in the image of the light pattern as reflected from the object to form a contrast-enhanced image of the light pattern as reflected from the object, and based upon a motion of the object as detected via the contrast-enhanced image of the light pattern, controlling an application that is providing output to a display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, the performance of a structured light depth sensor may be affected by the intensity and nature of ambient light present when an image is captured for depth analysis. To avoid problems with ambient light, a structured light depth sensor may include a narrow bandpass filter, matched to the wavelength of the laser, that limits the wavelengths of light that reach the depth image sensor. However, various forms of ambient light may be present in wavelengths that can pass through such a bandpass filter. For example, a structured light depth sensor with a bandpass filter configured to pass light in the near-infrared spectrum may be affected by ambient light sources such as incandescent lights and sunlight, as such sources emit broadly across the infrared spectrum. Depending upon the intensity of ambient light from such sources in a desired use environment, the presence of such ambient light may make it difficult to detect the structured light pattern in an acquired image.

Figure 1:
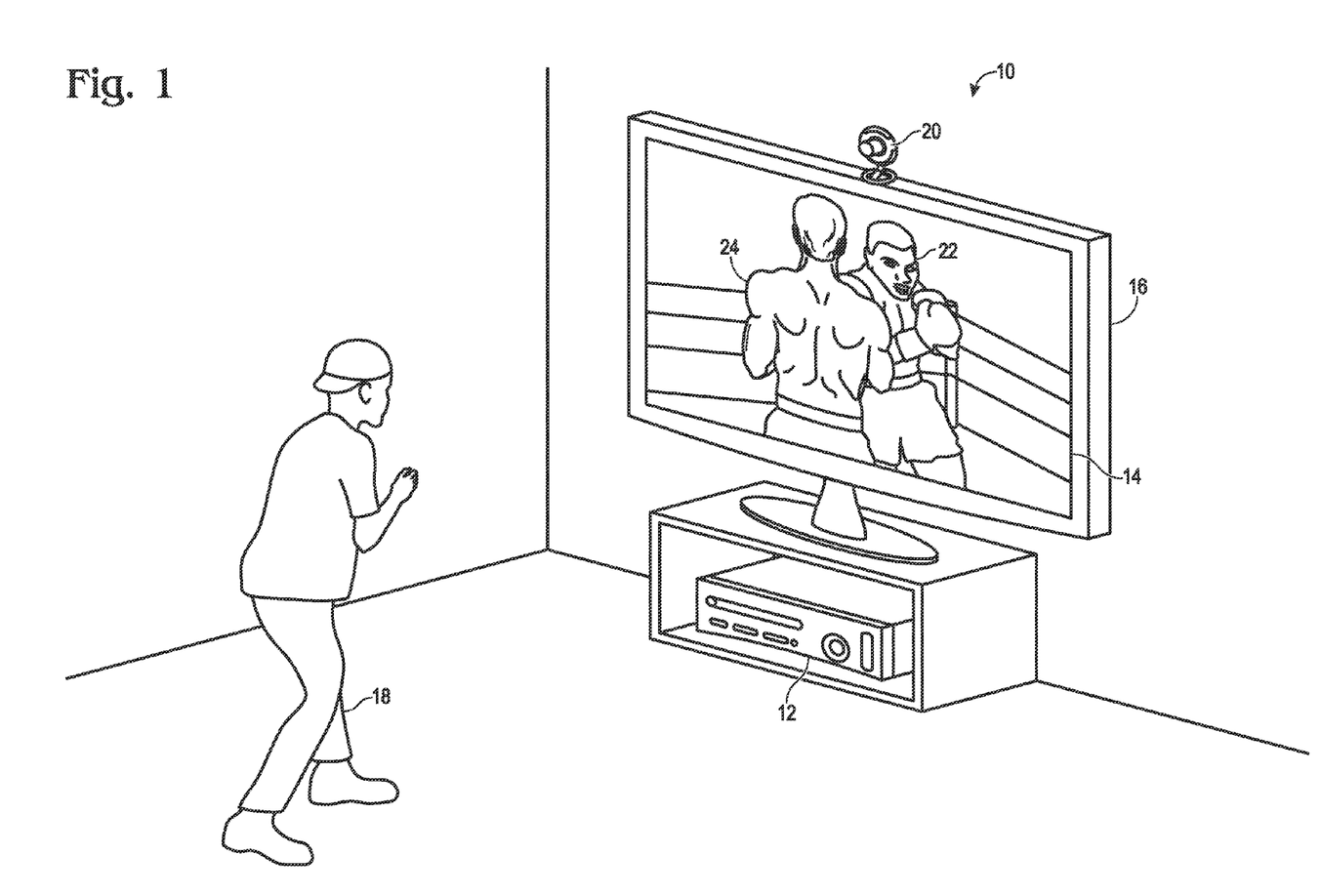
FIG. 1 shows an embodiment of an example use environment for a structured light depth sensor.

Therefore, various embodiments are disclosed herein related to the enhancement of image contrast in a structured light depth sensor. Prior to discussing image contrast enhancement, an embodiment of an example use environment is discussed with reference to FIG. 1. In particular, FIG. 1 shows a computer gaming system 12 that may be used to play a variety of different games, play one or more different media types, and/or control or manipulate non-game applications. FIG. 1 also shows a display 14 in the form of a television 16 that may be used to present game visuals to game players, such as game player 18. Furthermore, FIG. 1 shows a capture device in the form of a depth sensor 20, which may be used to visually monitor one or more game players, such as game player 18.

The depth sensor 20 may be used in combination with software on the gaming system 12 to track one or more targets, such as game player 18, in the field of view ("target") of the depth sensor 20, by comparing images of the targets taken at different times to detect motion. Gaming system 12 may then display a response to the motion on the television 16. FIG. 1 shows a scenario in which game player 18 is tracked using depth sensor 20 so that the movements of game player 18 may be interpreted by gaming system 12 as controls that can be used to affect the game being executed by gaming system 12. In other words, game player 18 may use his movements to control the game. The movements of game player 18 may be interpreted as virtually any type of game control.

The example scenario illustrated in FIG. 1 shows game player 18 playing a boxing game that is being executed by gaming system 12. The gaming system uses television 16 to visually present a boxing opponent 22 to game player 18. Furthermore, the gaming system uses television 16 to visually present a player avatar 24 that gaming player 18 controls with his movements. In one example scenario, game player 18 can throw a punch in physical space as an instruction for player avatar 24 to throw a punch in game space. Gaming system 12 and depth sensor 20 can be used to recognize and analyze the punch of game player 18 in physical space so that the punch can be interpreted as a game control that causes player avatar 24 to throw a punch in game space. Likewise, other movements by game player 18 may be interpreted as other controls, such as controls to bob, weave, shuffle, block, jab, or throw a variety of different power punches. Furthermore, some movements may be interpreted into controls that serve purposes other than controlling player avatar 24. For example, the player may use movements to end, pause, or save a game, select a level, view high scores, communicate with a friend, etc. It will be understood that the use environment of FIG. 1 is shown for the purpose of example, and that a structured depth sensor may be used in any other suitable use environment.

Figure 2:
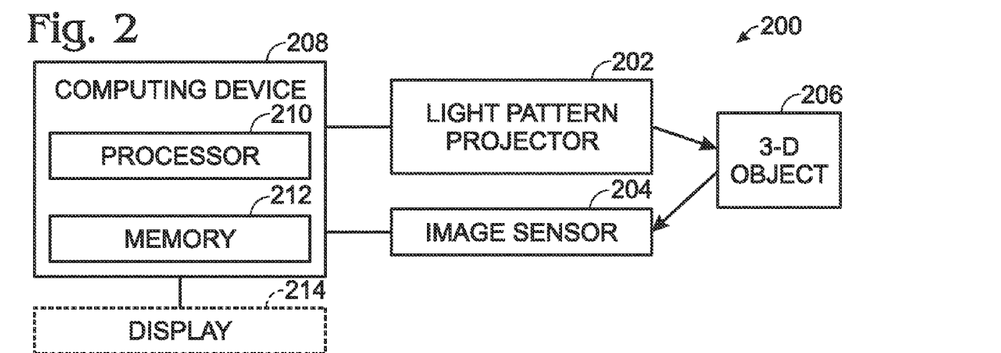
FIG. 2 shows a block diagram of an example embodiment of a structured light depth sensor.

FIG. 2 shows a block diagram of an example embodiment of a structured light depth sensor system 200. The structured light depth sensor system 200 comprises a light pattern projector 202 configured to project a predetermined light pattern, and an image sensor 204 configured to detect an image of the light pattern as reflected by an object 206 located in the field of view (FOV). The light pattern projector 202 and the image sensor 204 are each in communication with a computing device 208 configured to control the light pattern projector, to control and receive data from the image sensor, and to analyze the data received from the image sensor to determine depth values for the locations in the FOV, e.g. at each pixel in the image. As such, the computing device comprises a processor 210 and memory 212 containing instructions executable by the processor to perform various tasks related to these functions, as well as any other suitable functions.

In some embodiments, the computing device 208 comprises an on-board controller that is contained in a single housing with the light pattern projector 202 and the image sensor 204. In other embodiments, the computing device 208 may be housed separately from the light pattern projector 202 and the image sensor 204, e.g. as a desktop computer, laptop computer, server, etc. Likewise, in some embodiments, the light pattern projector 202 and image sensor 204 may be contained within a single housing, while in other embodiments, the light pattern projector 202 and image sensor 204 may be separate components that are calibrated to one another based upon their relative positions.

Continuing with FIG. 2, in some embodiments, the structured light depth sensor system 200 may be configured to provide output to a display 214. For example, where the computing device 208 is a video game console, the computing device 208 may be configured to provide output to a television, monitor, or other display device to display feedback to player movements via the video game. It will be understood that the block diagram shown in FIG. 2 is presented for the purpose of example, and that a structured light depth sensor system may have any other suitable configuration than that shown.

Figure 3:
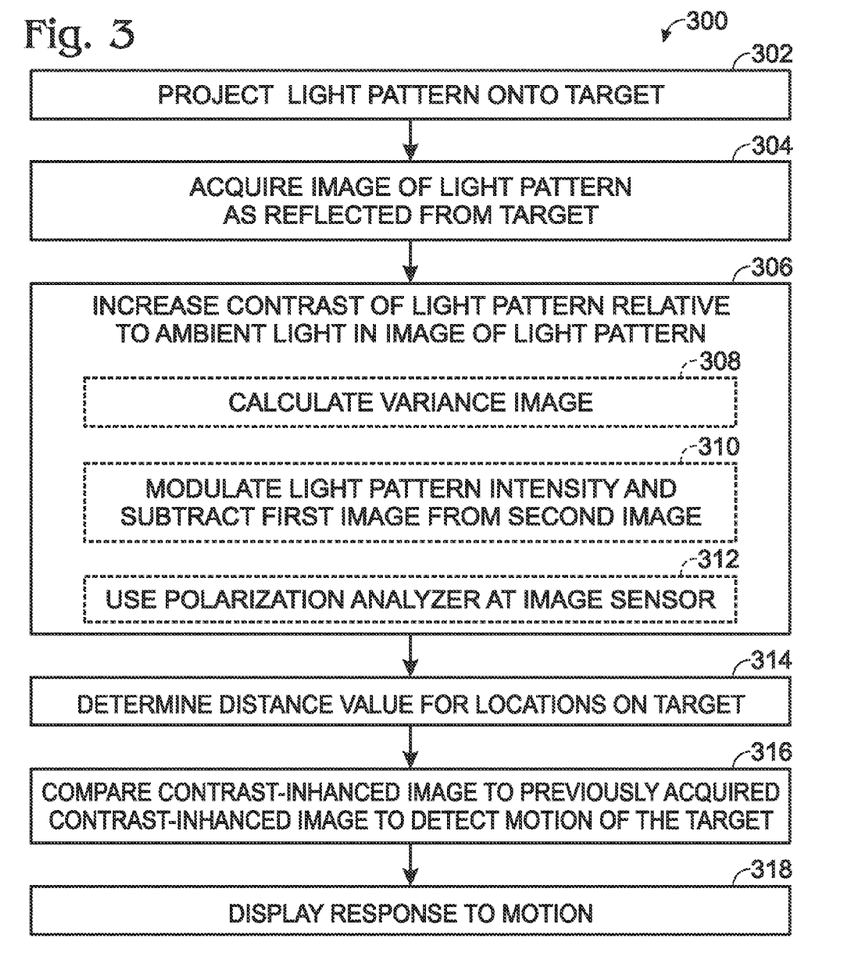
FIG. 3 shows a flow diagram depicting an embodiment of a method of operating a structured light depth sensor.

As mentioned above, in some situations, ambient light may reduce a contrast of a structured light pattern in an image. This may make the determination of distance values from the structured light pattern in the image more difficult. This problem may be particularly evident under conditions with high intensity ambient light from a broadband source, e.g. bright sunlight. Therefore, FIG. 3 shows a flow diagram depicting an embodiment of a method 300 of operating a structured light depth sensor system to aid in depth detection where ambient light may reduce image contrast.

First, method 300 comprises, at 302, projecting a light pattern onto a target. The light pattern may be created and projected in any suitable manner. For example, in some embodiments, a laser projector is used to create a structured light pattern in the form of a speckle pattern. Likewise, a diffraction grating or other diffractive optical element may be used in combination with a laser to create a diffraction pattern. In yet other embodiments, a scanning laser projector may be used to create a pattern. Further, incoherent light sources also may be used to create a structured light pattern. For example, an incoherent light source may be used in combination with a collimating lens and a light valve such as a liquid crystal display (LCD) panel, a digital light processing (DLP) chip, or the like, to create an image for projection onto a scene. It will be understood that these examples of methods to project a structured light pattern are presented for the purpose of example, and are not intended to be limiting in any manner.

While projecting the structured light pattern onto the target, method 300 comprises, at 304, acquiring an image of the structured light pattern as reflected from objects in the target, and at 306, increasing a contrast of the reflected structured light pattern relative to ambient light in the image of the structured light pattern to form a contrast-enhanced image of the structured light pattern as reflected from the target. Then, distance values for locations in the target are determined at 314, for example, as distance values for each pixel in the image. Next, at 316, method 300 comprises comparing the contrast-enhanced image to a previously acquired contrast-enhanced image of the target, and if motion of the target is detected, then displaying, at 318, a response to the motion on a display. For example, in the specific context of the video game system shown in FIG. 1, a response may be displayed in the form of motion performed by an avatar displayed in the video game, and/or by performing a video game control function, such as pause/resume game play, turning on or off video game system power, etc.

The contrast of the structured light image may be increased in any suitable manner. For example, in some embodiments and as indicated at 308, a variance filter may be applied to the image acquired at 304 to form a variance image, and then the variance image may be used to determine distance values. In other embodiments, as indicated at 310, the intensity of the projected structured light pattern may be modulated at a rate substantially greater than a rate at which ambient light intensities generally change, and a plurality of images may be acquired at different projected light intensities. Then, a first image may be subtracted from a second image to correct for ambient light. In yet other embodiments, as indicated at 312, the structured image may be projected via polarized light. This allows the use of a polarization analyzer or filter located between the target and the image sensor (for example, at the image sensor) to reduce ambient light.

First referring to the application of a variance filter at 308, the variance filter determines at each pixel in an image relative to one or more nearby pixels. Thus, the variance image has higher pixel amplitudes in regions of higher gradient between pixels, and lower pixel amplitudes in regions of lower gradient between pixels. As such, the variance image may help to locate the borders of the structured light patterns in an image, as background regions between these borders may have values close to zero in the variance image even in the presence of significant ambient light intensities. The use of a variance filter to increase image contrast may offer the advantage that contrast may be increased through software and/or firmware implementations alone, without any hardware modifications.

Any suitable variance filter may be applied. For example, in some embodiments, an m×n matrix of pixels (where m and n are positive non-zero integers, and at least one of m and n is greater than 1) is selected around each pixel in the image, and the statistical variance of the matrix is calculated. Performing this process over all pixels of the image sensor yields the variance image. Examples of suitable m×n matrices include, but are not limited to, 2×2 and 3×3 matrices. It will be understood that other statistical methods may be used to calculate a variance image without departing from the scope of disclosure. It will be understood that the terms "variance image", "variance filter", and the like as used herein refer to any image and filter for creating such an image that increase a contrast of an image based upon gradients between pixels in an image.

Next referring to the modulation of light pattern intensity at 310, during ordinary use conditions, ambient light intensities generally change at relatively low frequencies. For example, in exterior use environments, ambient light changes as passing clouds modify the intensity of sunlight, as the sun rises and sets, etc. Likewise, in interior use environments, ambient light intensities change as lights are turned on and off, etc. Therefore, under such use conditions, the ambient light may have relatively constant values over time frames of seconds, minutes, or even hours. Therefore, modulating the intensity of structured light image may allow images to be acquired that have approximately equal ambient light intensity levels but different structured light pattern intensity levels. Thus, a first image of the target at a first, higher light pattern intensity and to a second image of the target at a second, lower light pattern intensity may be subtracted to substantially remove ambient light from the two images, thereby increasing the contrast of the structured light image in the resulting image.

The intensity of the structured light pattern may be varied in any suitable manner. For example, in one embodiment, the intensity of the structured light pattern is turned on and off at a frequency of ½ the image acquisition and integration speed of the image sensor such that every other image taken by the image sensor is taken with the pattern and the subsequent image with ambient light but without the pattern. An image taken with the pattern may then be mathematically manipulated with an image taken without the pattern, for example, via subtraction, to reduce or remove ambient light from the image, thereby improving contrast of the structured light pattern. In other embodiments, the structured light pattern may be turned either on or off for more two or more sequential frames such that ambient-only images are acquired either more or less frequently than every other image, and/or may be partially dimmed instead of turned off.

Figure 4:
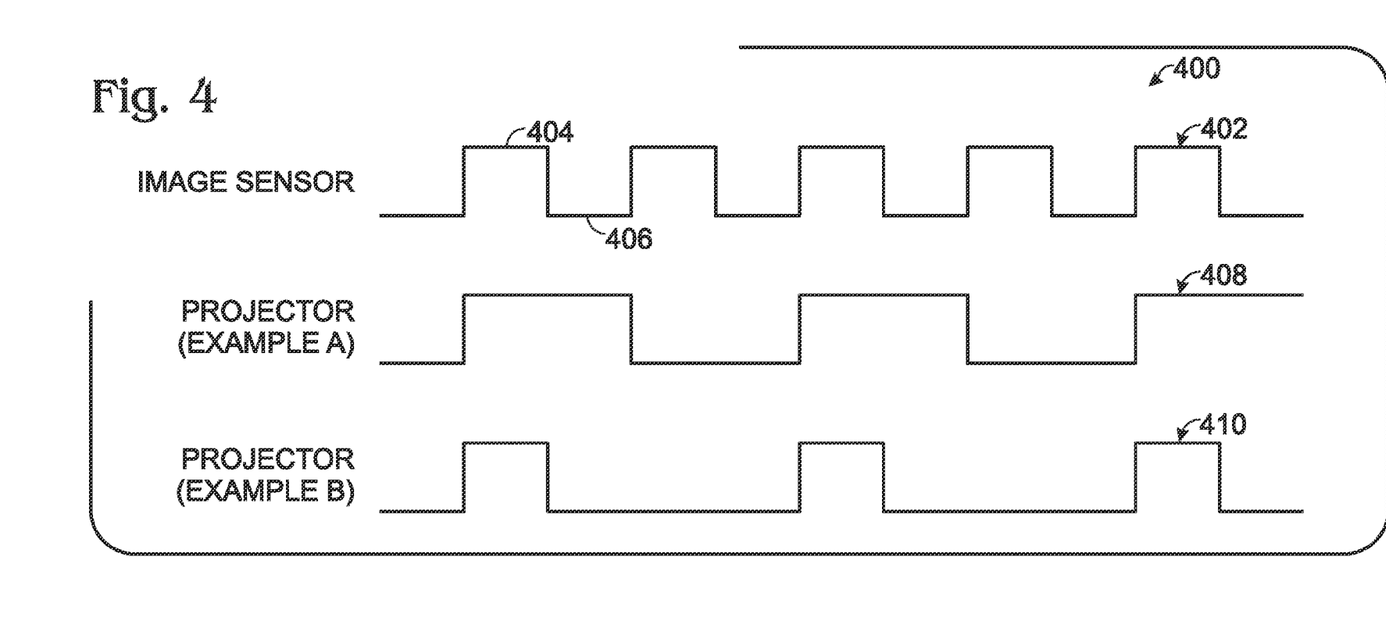
FIG. 4 shows a timing diagram that illustrates two example embodiments of methods of modulating an intensity of a projected structured light pattern.

FIG. 4 shows a timing diagram 400 illustrating two example embodiments of methods of modulating an intensity of a projected structured light image. First, line 402 illustrates the operation of the image sensor. The image integration periods are shown as peaks 404 and sensor reading periods are shown as troughs 406. Next, line 408 shows a first example method of modulating a structured light intensity. As depicted, projected light intensity is modulated at ½ the frequency of the image sensor frame rate. In this manner, every two sequential image frames acquired by the image sensor comprises one structured light pattern image and one ambient-only image. Thus, sequential may be used for a subtraction operation to increase image contrast by removing ambient light from the image. In other embodiments where non-sequential images have different structured light pattern intensities, non-sequential images may be subtracted to increase image contrast.

Line 410 depicts a second example method of modulating a structured light intensity. Whereas line 408 depicts the projected light remaining on for a full integration/read cycle, line 410 depicts the projected light remaining on for every other integration process, and then being turned off for the corresponding read process and the next integration/read cycle. This may help to reduce power consumption relative to the method depicted via line 408. It will be appreciated that either of these methods, as well as other image intensity modulation methods, may offer reduced power consumption relative to the continuous projection of a structured light image. The reduction in total power also may help to increase the lifetime of the laser.

Some interior light may have a beat frequency of 60 Hz (or other) that is due to the frequency of the AC power used to power the interior light sources. Therefore, in such environments, the ambient light may vary at this frequency. Thus, a depth sensor configured for use in such environments may be configured to acquire images at a multiple or harmonic of 60 Hz (e.g. 30 Hz) so that the ambient light intensity is the same for each image acquired. It will be understood that the specific light modulation examples discussed herein are presented for the purpose of example, and that any other suitable scheme may be used to modulate the intensity of a projected structured light pattern to correct for ambient light without departing from the scope of the present disclosure.

Figure 5:
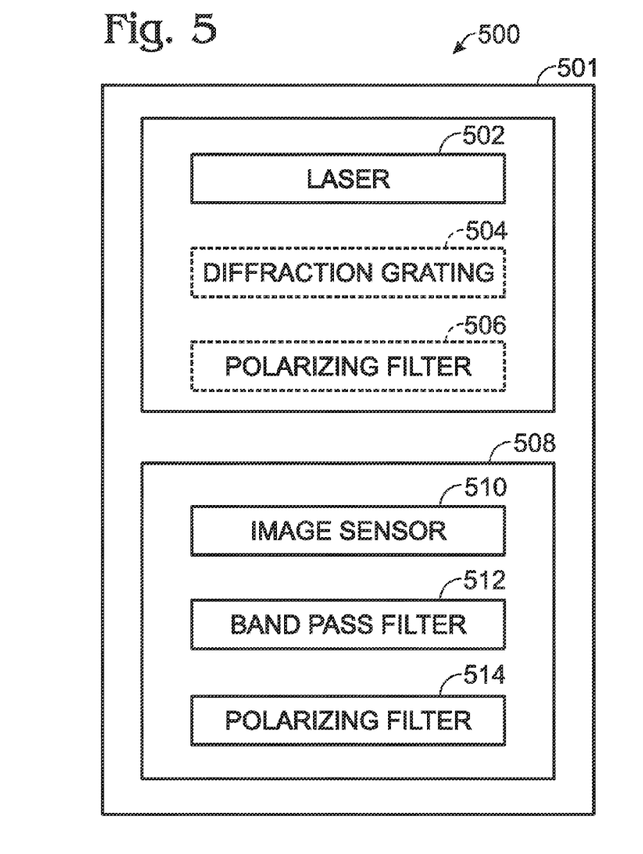
FIG. 5 shows a block diagram of another example embodiment of a structured light depth sensor.
Figure 6:
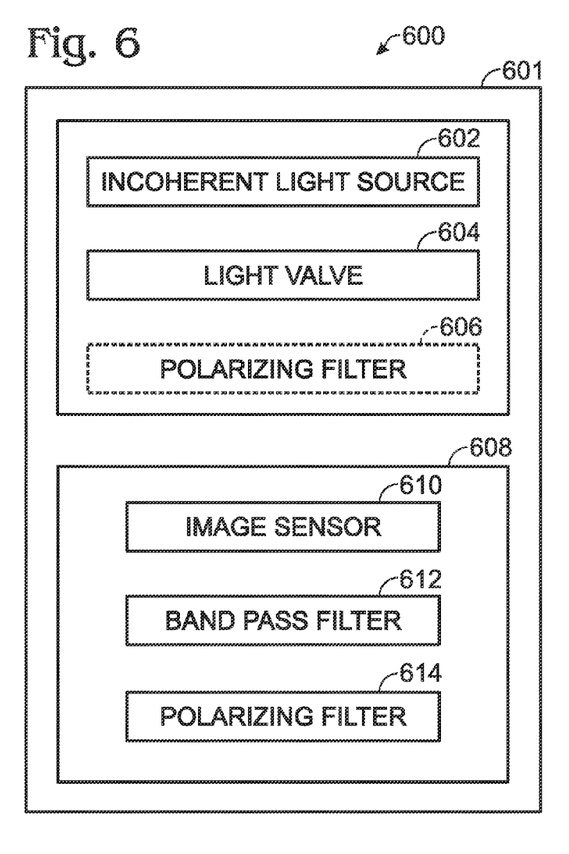
FIG. 6 shows a block diagram of another embodiment of a structured light depth sensor.

Returning briefly to FIG. 3, as indicated at 312, in some embodiments, a polarization filter may be used to prevent some light reflected from the target from reaching the image sensor to help increase image contrast, either alone or in combination with other methods of increasing image contrast. FIGS. 5 and 6 show block diagrams of examples of the optical components of depth sensors that comprise polarization filters used in combination with image sensors. First regarding FIG. 5, a depth sensor 500 is shown with projection optics 501 that comprise a laser projector 502 used to produce a structured light pattern. The laser projector 502 may be used in combination with an optional diffraction grating 504 to create the structured light pattern, or may create the structured light pattern in any other suitable manner (e.g. via scanning, speckle, etc.). The laser projector 502 may emit light that has a relatively high degree of polarization. Further, an optional polarization filter 506 may be used to increase a degree of polarization of light from the laser.

Polarized light from the laser that is reflected off of objects in the target may have a reduced polarization due to scattering during reflection, but the reflected light may still have a partial degree of linear polarization. On the other hand, ambient light sources such as the sun and incandescent lighting produce unpolarized light. Therefore, image sensing optics 508 of depth sensor 500 may comprise an image sensor 510, a bandpass filter 512, and a polarization filter 514. The polarization filter 514 allows light polarized along one orientation to pass while that which is orthogonal will be blocked 510. Because the reflected structured light pattern has a predominant orientation, as long as the polarization filter 514 is correctly aligned to the predominant orientation of the reflected structure light pattern, the reduction in intensity of the reflected structured light pattern caused by the polarization filter 514 is less than the reduction of intensity of ambient light (50%) caused by the polarization filter 514. This may help to increase the contrast in the image of the structured light pattern. The bandpass filter 512 may be configured to pass a narrow band of light that includes the wavelengths emitted by laser projector 502 to further reduce ambient light levels.

FIG. 6 shows a block diagram of another embodiment of a depth sensor 600 configured to increase image contrast via a polarization filter. The projection optics of sensor 600 are shown at 601. Whereas depth sensor 500 utilizes a coherent light source, depth sensor 600 utilizes an incoherent light source 602, such as one or more light-emitting diodes, configured to provide light to a light valve 604, such as an LCD panel, DLP chip, or the like, for projection of a structured light pattern. Where an LCD panel is used to project the structured light pattern, the LCD panel itself acts as a first polarization filter to produce polarized light. On the other hand, where the light valve 604 does not produce polarized light (e.g. a DLP light valve), the projection optics 601 also may comprise a separate first polarization filter 606 so that the structured light pattern is projected with polarized light.

As mentioned above, the structured light pattern reflected from object in the target may retain a partial degree of linear orientation. Therefore, the image sensing optics 608 of depth sensor 600 comprise an image sensor 610, and a second polarization filter 614 configured to pass light of the same orientation as the predominant orientation of the reflected structured light pattern. In this manner, the intensity of ambient light is reduced by a greater amount (50%) than the intensity of the reflected structured light pattern. Further, the image sensing optics 608 of the depth sensor also may include a band pass filter 612 configured to pass light of the wavelength or wavelengths emitted by incoherent light source 602.

It will be understood that the configurations and/or approaches described herein for increasing image contrast in a structured light depth sensor are presented for the purpose of example and not intended to be limiting, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and non-obvious combinations and subcombinations of the various processes, systems and configurations, and other features, functions, acts, and/or properties disclosed herein, as well as any and all equivalents thereof.

The invention claimed is:

1. In a computing device, a method comprising:
controlling a modulation of an intensity of a structured light pattern being projected;
receiving a first image of the structured light pattern as reflected from an object at a first light pattern intensity;
receiving a second image of the structured light pattern as reflected from the object at a second light pattern intensity;
subtracting the first image from the second image to form a contrast-enhanced image of the structured light pattern;
comparing the contrast-enhanced image of the structured light pattern to one or more other contrast-enhanced images of the structured light pattern formed at different times;
detecting motion of the object over time based on comparing the contrast-enhanced image to the one or more other contrast-enhanced images; and
applying the motion detected to an application that is providing output to a display.

2. The method of claim 1, wherein controlling the modulation of the intensity of the structured light pattern comprises controlling turning of the structured light pattern on and off.

3. The method of claim 1, wherein applying the motion detected to the application comprises controlling movement of a displayed avatar.

4. The method of claim 1, further comprising determining a variance image from one or more of the first image, the second image, and the contrast-enhanced image.

5. The method of claim 4, wherein determining the variance image comprises, for each pixel of a selected image, determining a variance value from an m×n array of nearby pixels, wherein at least one of m and n has a value of at least 2.

6. The method of claim 1, wherein controlling modulation of the intensity of the structured light pattern comprises controlling the modulation as a function of time at a rate based upon a beat frequency of an ambient light source.

7. The method of claim 1, wherein controlling the modulation of the intensity of the structured light pattern comprises controlling the modulation as a function of time such that the structured light pattern is displayed at the first light pattern intensity for duration of equal to or less than an integration/read cycle of an image sensor.

8. In a computing device, a method comprising:
controlling projection of a light pattern onto an object;
controlling modulation of an intensity of the light pattern between at least a first light pattern intensity and a second light pattern intensity as a function of time at a rate based upon a beat frequency of an ambient light source such that the light pattern is displayed at the first light pattern intensity for a duration of equal to or less than an integration/read cycle of an image sensor;
receiving a first image of the light pattern as reflected from the object and a second image of the light pattern as reflected from the object;
subtracting the first image from the second image to form a contrast-enhanced image of the light pattern;
detecting motion of the object over time by comparing the contrast-enhanced image of the light pattern to other contrast-enhanced images of the light pattern formed at different times; and
applying the motion detected to an application that is providing output to a display.

9. The method of claim 8, wherein controlling the modulation of the intensity of the light pattern comprises controlling turning of the light pattern on and off.

10. The method of claim 8, wherein applying the motion detected to the application comprises controlling movement of a displayed avatar.

11. The method of claim 8, further comprising determining a variance image from one or more of the first image, the second image, and the contrast-enhanced image.

12. The method of claim 11, wherein determining the variance image comprises, for each pixel, determining a variance value from an m×n array of nearby pixels, wherein at least one of m and n has a value of at least 2.

13. The method of claim 8, wherein controlling the modulation of the intensity of the light source comprises controlling the modulation of an intensity of a laser.

14. The method of claim 8, wherein receiving the first image and the second image comprises receiving the first image and the second image from a depth camera.

15. On a computing device, a method comprising:
controlling projection of a structured light pattern;
receiving from an image sensor a plurality of images of the structured light pattern as reflected from an object;
for each image received from the image sensor, determining a variance image from the image, the variance image comprising a plurality of pixels each having an amplitude based upon a gradient between that pixel and one or more adjacent pixels of the image;
comparing the variance image to one or more other variance images determined at other times to detect motion of the object; and
applying the motion of the object detected to an application that is providing output to a display.

16. The method of claim 15, wherein determining the variance image comprises, for each pixel, determining a variance value from an m×n array of nearby pixels, wherein at least one of m and n has a value of at least 2.

17. The method of claim 15, wherein the variance image comprises higher pixel amplitudes in regions of higher gradient between pixels, and lower pixel amplitudes in regions of lower gradient between pixels.

18. The method of claim 15, wherein applying the motion of the object detected to the application comprises controlling movement of a displayed avatar.

* * * * *